United States Patent
Song et al.

(10) Patent No.: US 9,094,690 B2
(45) Date of Patent: Jul. 28, 2015

(54) INTER-PREDICTION METHOD AND VIDEO ENCODING/DECODING METHOD USING THE INTER-PREDICTION METHOD

(75) Inventors: Jinhan Song, Seoul (KR); Jeongyeon Lim, Gyeonggi-do (KR); Jongki Han, Seoul (KR); Yunglyul Lee, Seoul (KR); Joohee Moon, Seoul (KR); Haekwang Kim, Seoul (KR); Byeungwoo Jeon, Gyeonggi-do (KR); Chanwon Seo, Seoul (KR); Hyoungmee Park, Gyeonggi-do (KR); Daeyeon Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 13/641,670

(22) PCT Filed: Apr. 12, 2011

(86) PCT No.: PCT/KR2011/002545
§ 371 (c)(1),
(2), (4) Date: Oct. 16, 2012

(87) PCT Pub. No.: WO2011/129573
PCT Pub. Date: Oct. 20, 2011

(65) Prior Publication Data
US 2013/0034156 A1 Feb. 7, 2013

(30) Foreign Application Priority Data

Apr. 16, 2010 (KR) .................. 10-2010-0035222
Dec. 16, 2010 (KR) .................. 10-2010-0129059

(51) Int. Cl.
*H04N 7/12* (2006.01)
*H04N 11/02* (2006.01)
(Continued)

(52) U.S. Cl.
CPC ............. *H04N 19/58* (2014.11); *H04N 19/105* (2014.11); *H04N 19/423* (2014.11); *H04N 19/46* (2014.11); *H04N 19/44* (2014.11)

(58) Field of Classification Search
CPC ... H04N 19/105; H04N 19/423; H04N 19/44; H04N 19/46; H04N 19/58
See application file for complete search history.

(56) References Cited

U.S. PATENT DOCUMENTS 7,889,788 B2 * 2/2011 Toma et al. .................. 375/240
7,889,792 B2 * 2/2011 Dumitras et al. ........ 375/240.13
(Continued)

FOREIGN PATENT DOCUMENTS

KR 10-2007-0032111 3/2007
KR 10-2007-0096979 10/2007
KR 10-2008-0084890 9/2008

OTHER PUBLICATIONS

International Search Report mailed Dec. 27, 2011 for PCT/KR2011/002545, citing the above reference(s).
European Search Report for application No. EP11769039 dated Sep. 9, 2013, citing the above reference(s).
Chinese Office Action dated Nov. 4, 2014.

*Primary Examiner* — Nhon Diep
(74) *Attorney, Agent, or Firm* — Lowe Hauptman & Ham, LLP

(57) ABSTRACT

An inter-prediction method and a video encoding/decoding method using the inter-prediction method are disclosed. The video encoding method using inter-prediction includes: encoding a first picture that serves as a reference for random access; inter-prediction encoding a block included in a second picture, which is displayed before the first picture, by using a plurality of reference pictures; generating reference picture information representing whether a past picture, which is displayed before the second picture, is used as a reference picture for encoding the second picture; and transmitting the encoded first and second pictures and the reference picture information.

9 Claims, 15 Drawing Sheets

(51) Int. Cl.
*H04N 11/04* (2006.01)
*H04N 19/58* (2014.01)
*H04N 19/105* (2014.01)
*H04N 19/46* (2014.01)
*H04N 19/423* (2014.01)
*H04N 19/44* (2014.01)

(56) References Cited

U.S. PATENT DOCUMENTS

| | | | |
|---|---|---|---|
| 8,194,751 B2 * | 6/2012 | Notoya et al. | 375/240.25 |
| 8,416,859 B2 * | 4/2013 | Rodriguez et al. | 375/240.26 |
| 2005/0147167 A1 | 7/2005 | Dumitras et al. | |
| 2008/0192830 A1 | 8/2008 | Ahn et al. | |

* cited by examiner

INTER-PREDICTION METHOD AND VIDEO ENCODING/DECODING METHOD USING THE INTER-PREDICTION METHOD

CROSS REFERENCE TO RELATED APPLICATION

This application claims the priority of Korean Patent Application No. 10-2010-0035222, filed on Apr. 16, 2010 and Korean Patent Application No. 10-2010-0129059, filed on Dec. 16, 2010 in the KIPO (Korean Intellectual Property Office). Further, this application is the National Phase application of International Application No. PCT/KR2011/002545 filed Apr. 12, 2011, which designates the United States and was published in Korean.

TECHNICAL FIELD

The present disclosure relates to a video encoding/decoding apparatus and method. More particularly, the present disclosure relates to an inter-prediction method, which is capable of preventing a reduction in encoding efficiency during the use of IDR picture for random access, and video encoding/decoding technology using the inter-prediction method.

BACKGROUND

The statements in this section merely provide background information related to the present disclosure and may not constitute prior art.

H.264/AVC uses Instantaneous Decoding Refresh (IDR) picture for enabling an encoded bitstream to be randomly decoded from a specific time position. As illustrated in FIG. 1, an encoder deletes decoded pictures from a Decoded Picture Buffer (DPB) and clears the DPB immediately before encoding IDR picture. As in the case of the encoder, a decoder also clears a DPB immediately before decoding IDR picture.

Pictures to be encoded or decoded after the IDR picture of FIG. 1 are encoded with reference to the IDR picture and pictures encoded and decoded after the IDR picture.

An IDR picture encoding method is substantially identical to an I picture encoding method. However, the IDR picture encoding method supports a random access function that enables a decoding process to be performed from a random IDR picture time point by inserting IDR picture.

When encoding inter-pictures, H.264/AVC predicts current picture by using pictures previously encoded and decoded. As illustrated in FIG. 2, in the case of P picture, a motion estimation is performed by using a past picture existing prior to current picture on the basis of display order. A residue signal between a current block and a block determined through the motion estimation is encoded.

As illustrated in FIG. 3, in the case of B picture, a motion estimation is performed by using past picture existing prior to current picture and future picture existing after the current picture on the basis of display order. Then, a residue signal between a current block and a block determined through the motion estimation is encoded.

According to the H.264/AVC standard, one or more sheets of reference pictures can be used for inter-picture estimation with respect to each prediction direction. Due to this function, H.264/AVC exhibits superior compression performance to other picture compression standards.

H.264/AVC uses IDR picture for supporting a random access function. As illustrated in FIG. 4, an encoder and a decoder clears a DPB immediately before encoding and decoding IDR picture. Hence, with respect to some of B pictures displayed before the IDR picture, bidirectional motion estimation cannot be performed during encoding, and therefore, only unidirectional motion estimation is performed. Consequently, the encoding efficiency of pictures performing only the unidirectional motion estimation is reduced.

In addition, as illustrated in FIG. 5, specific P pictures displayed after the IDR picture can use only one IDR picture for the reference picture, but cannot use a plurality of pictures prior to the IDR picture for the reference picture. Therefore, the encoding efficiency of the P picture may be reduced.

DISCLOSURE

Technical Problem

Therefore, to solve the above-mentioned problems, the present disclosure seeks to provide an inter-prediction method, which is capable of solving the problems of conventional IDR picture used for supporting a random access and improving the encoding and decoding efficiencies, and a video encoding/decoding method using the inter-prediction method.

SUMMARY

An embodiment of the present disclosure provides a video encoding method using inter-prediction, including: encoding a first picture that serves as a reference for random access; inter-prediction encoding a block included in a second picture, which is displayed before the first picture, by using a plurality of reference pictures; generating reference picture information representing whether a past picture, which is displayed before the second picture, is used as a reference picture for encoding the second picture; and transmitting the encoded first and second pictures and the reference picture information. When a past reference picture is used for encoding the second picture, the reference picture information may be information representing the past reference picture. When a past reference picture is used for encoding the second picture, an encoder may encode at least the second picture, and delete reference pictures encoded after the encoding of the first picture, again decoded and stored in a memory.

When encoding the second picture displayed before or after the first picture, in the case where past pictures prior to the current second picture are stored in a memory storing reference pictures, the stored past pictures may be copied to a memory storing future reference pictures of the current second picture and be used as future reference pictures. A current second picture may be encoded by using pictures of a future reference picture memory as well as pictures of a past reference picture memory. In the case where future pictures after a current second picture are stored in a memory storing reference pictures, the stored future reference pictures may be copied to a memory storing past reference pictures of the current second picture and be used as past reference pictures of the current second picture. A current second picture may be encoded by using pictures of a future reference picture memory as well as pictures of a past reference picture memory. The first picture may be R picture corresponding to IDR picture, and the second picture may be B picture or P picture. The terms "IDR picture" and "R picture" in this present disclosure are named for convenience and may be referred to by other names.

Another embodiment of the present disclosure provides a video encoding method using inter-prediction, including:

encoding a first picture that serves as a reference for random access; and inter-prediction encoding a block included in a second picture, which is displayed before the first picture, by using a plurality of reference pictures, wherein the inter-prediction encoding of the block included in the second picture uses one or more pictures, which are obtained by modifying a decoded first picture obtained by decoding the encoded first picture, as reference pictures. The video encoding method may further include: generating modification identification information representing a modification type of the decoded first picture; and transmitting the encoded first and second pictures and the modification identification information to a decoder. The first picture may be R picture corresponding to IDR picture, and the second picture may be B picture.

Yet another embodiment of the present disclosure provides a video decoding method using inter-prediction, including: decoding a first picture that serves as a reference for random access; and inter-prediction decoding a block included in a second picture, which is displayed before the first picture, by using a plurality of reference pictures, wherein the decoding of the block included in the second picture is performed based on reference picture information representing whether a past picture displayed before the second picture is used as a reference picture for encoding the second picture. When a past reference picture is used for decoding the second picture, the reference picture information may be information representing the past reference picture, and when a past reference picture is used for decoding the second picture, a decoder may decode at least the second picture, and delete reference pictures decoded prior to the decoding of the first picture and stored in a memory.

When decoding the second picture displayed before or after the first picture, in the case where past pictures before a current second picture are stored in a memory storing reference pictures, the stored past pictures may be copied to a memory storing future reference pictures of the current second picture and be used as future reference pictures. A current second picture may be decoded by using pictures of a future reference picture memory as well as pictures of a past reference picture memory. When future pictures after a current second picture are stored in a memory storing reference pictures, stored future reference pictures may be copied to a memory storing past reference pictures of the current second picture and be used as past reference pictures of the current second picture. A current second picture may be decoded by using pictures of a future reference picture memory as well as pictures of a past reference picture memory. The first picture may be R picture corresponding to IDR picture, and the second picture may be B picture.

Yet another embodiment of the present disclosure provides a video decoding method using inter-prediction, including: decoding a first picture that serves as a reference for random access; and inter-prediction decoding a block included in a second picture, which is displayed before the first picture, by using a plurality of reference pictures, wherein in the decoding of the block included in the second picture, the decoded first picture is modified based on modification identification information representing a modification type of the decoded first picture, and the modified picture is used as a reference picture. The first picture may be R picture corresponding to IDR picture, and the second picture may be B picture.

Yet another embodiment of the present disclosure provides an inter-prediction method for video encoding or decoding, including: encoding or decoding a first picture that serves as a reference for random access; and inter-prediction encoding or decoding a block included in a second picture, which is displayed before the first picture, by using a plurality of reference pictures, wherein in the inter-prediction encoding or decoding of the block included in the second picture, the encoded and decoded picture or a picture obtained by modifying the decoded first picture is used as a reference picture. The first picture may be R picture corresponding to IDR picture, and the second picture may be B picture.

Yet another embodiment of the present disclosure provides an inter-prediction method for video encoding or decoding, including: encoding or decoding a first picture that serves as a reference for random access; inter-prediction encoding or decoding a block included in a second picture, which is displayed before the first picture, by using a plurality of reference pictures; and in the case where a past reference picture is used for encoding or decoding the second picture, after the encoding or decoding of the second picture is completed, deleting reference pictures encoded prior to the encoding of the first picture, again decoded and stored in a memory, or reference pictures decoded prior to the decoding of the first picture and stored in a memory.

When encoding or decoding a second picture displayed before or after the first picture, in the case where past pictures before a current second picture are stored in a memory storing reference pictures, the stored past pictures may be copied to a memory storing future reference pictures of the second picture and be used as future reference pictures. When future pictures after a current second picture are stored in a memory storing reference pictures, the stored future pictures may be copied to a memory storing past reference pictures of the current second picture and be used as past reference pictures. The first picture may be R picture corresponding to IDR picture, and the second picture may be P picture or B picture.

Yet another embodiment of the present disclosure provides an inter-prediction method for video encoding or decoding, including: encoding or decoding a first picture used as a reference picture; inter-prediction encoding or decoding a block included in a second picture, which is encoded or decoded after the first picture, by using a plurality of reference pictures; and when past and future reference pictures are used for encoding the second picture and past or future reference pictures do not exist, copying or modifying the first picture and using the copied or modified first picture as non-existing past or future reference pictures. The first picture may be a picture used as a reference picture of an inter-picture, and the second picture may be B picture or P picture.

Advantageous Effects

According to the present disclosure as described above, by resetting a DPB immediately before encoding IDR picture, P or B picture after the IDR picture is encoded by using the IDR picture and pictures reconstructed after the IDR picture, without referring to pictures reconstructed before the IDR picture. Therefore, it is possible to solve problems that reduce the encoding efficiency because a smaller number of reference pictures are used as compared to P or B pictures encoded before the IDR picture.

In addition, according to the present disclosure as described above, when the number of reference pictures of specific P or B picture is limited or smaller than the number reference pictures of other P or B pictures, a plurality of reference pictures are additionally provided by copying usable reference pictures and using an arbitrary picture processing method, thereby improving the encoding efficiency.

Moreover, according to the present disclosure as described above, new reference picture generating step and method introduce new syntax elements or equally operate an encoder or a decoder in accordance with a predefined algorithm. Since the encoder and the decoder generate the same reference pictures, the quality of reconstructed pictures generated by the encoder is equal to the quality of decoded pictures generated by the decoder.

DETAILED DESCRIPTION

Hereinafter, certain embodiments of the present disclosure will be described in detail with reference to the accompanying drawings.

Figure 1:
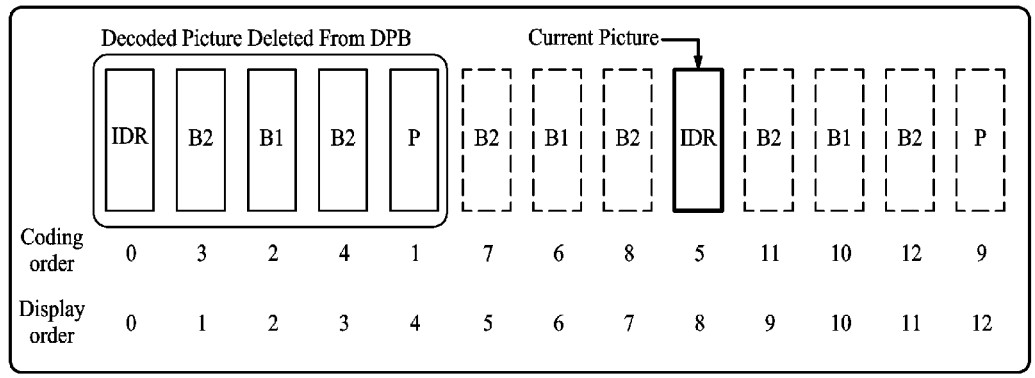
FIG. 1 is a diagram explaining conventional DPB management where past pictures before current picture are used for reference picture.
Figure 2:
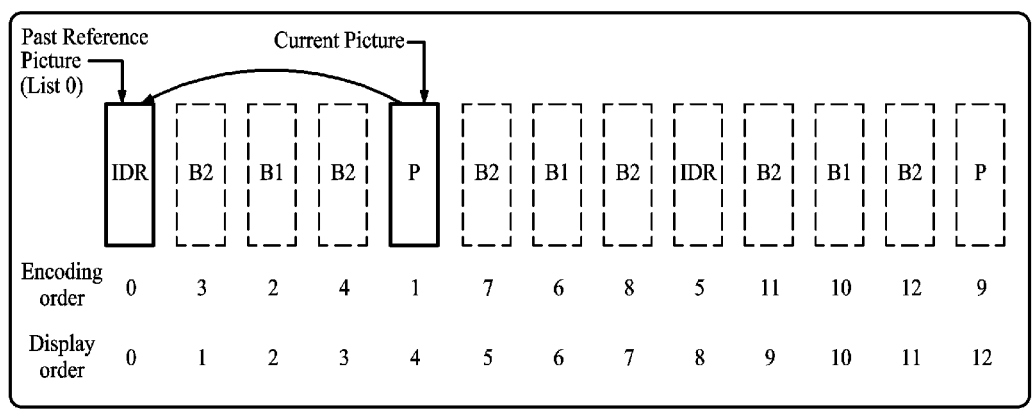
FIG. 2 is a diagram explaining a P picture prediction method.
Figure 3:
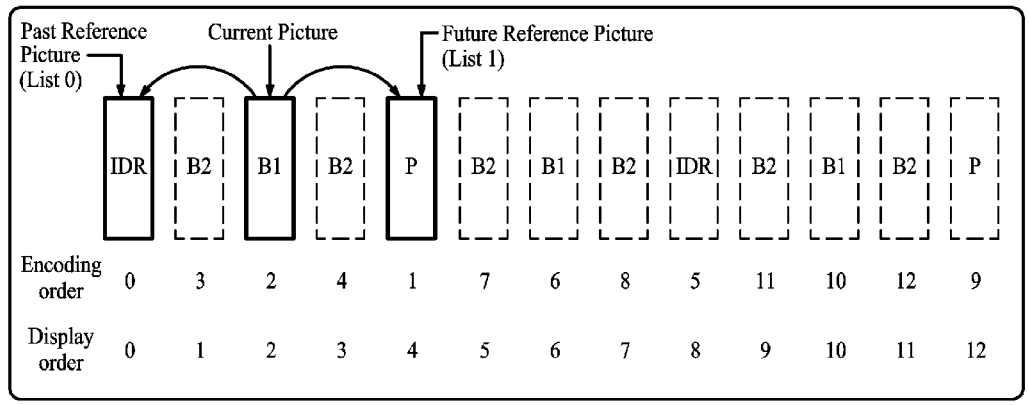
FIG. 3 is a diagram explaining a B picture prediction method.
Figure 4:
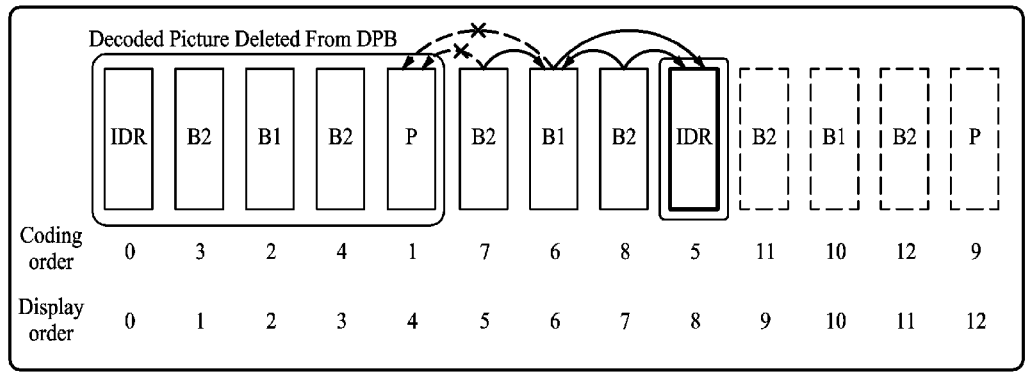
FIG. 4 is a diagram explaining problems of B picture encoding when conventional IDR picture is used.
Figure 5:
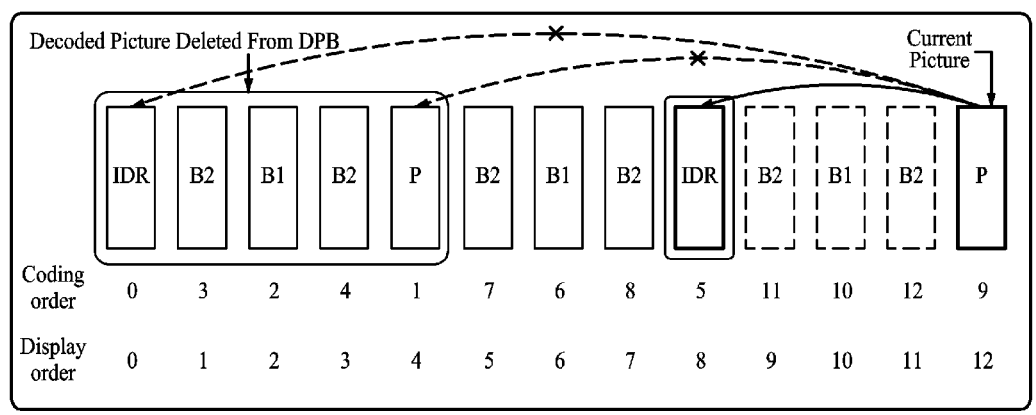
FIG. 5 is a diagram explaining problems of P picture encoding when conventional IDR picture is used.
Figure 6:
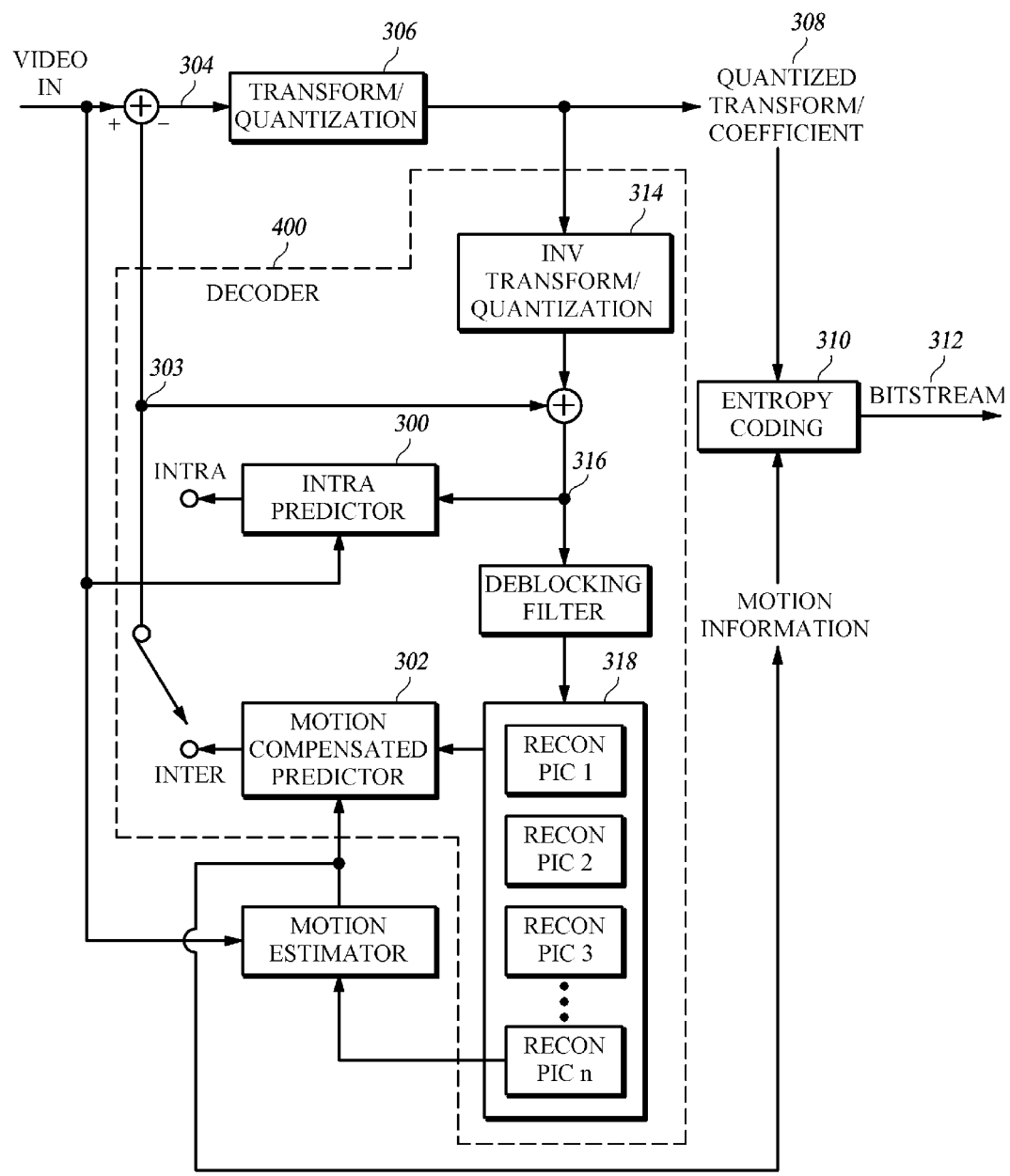
FIG. 6 is a diagram illustrating an example of an H.264 encoder and decoder.

FIG. 6 is a diagram illustrating an example of an H.264 encoder and decoder.

In a video compression standard such as H.264, pictures may be encoded as any one of I, P and B frames (or pictures). The I frame is encoded by using only a spatial correlation within a frame being currently encoded, and can be reconstructed (decoded) by using only one frame data in a decoder, without referring to other frames. The P frame is encoded by using inter-prediction referring to a reconstructed frame among frames existing in the past on the basis of display order, and a decoder can reconstruct current picture by using previously reconstructed picture. The B frame is encoded through inter-prediction using a forward reconstructed picture (list0 in H.264) and a backward reconstructed picture (list1 in H.264), and a decoder can reconstruct current picture by using the forward and backward reconstructed pictures.

Referring to FIG. 6, a video encoder performs an intra-prediction process 300 or an inter-prediction process 302, obtains a residue 304 between current frame and predicted picture 303, and generates a bitstream 312 by performing an entropy encoding process 310 on a quantized transform coefficient 308 obtained by performing a transform/quantization process 306 on intra or inter mode information and the residue. The encoded picture is generated as reconstructed picture 316 by undergoing an inverse quantization/inverse transform process 314 and adding to the predicted picture 303, and is stored in a memory buffer (decoded picture buffer (DPB)) 318 so as to be used for reference frame of pictures to be encoded as next P or B picture.

Referring to FIG. 6, a video decoder 400 is a part of the encoder. The video decoder 400 receives a bitstream, generates reconstructed picture 316 through the same process as a decoding loop of the encoder, and outputs the reconstructed picture 316 to a display stage such that a user views the picture. Also, the video decoder 400 stores the reconstructed picture 316 in the DPB 318 so as to be used for reference frame of pictures to be reconstructed next time.

In order to allow the decoder 400 to randomly access the picture, IDR frame (in the embodiment of the present disclosure, R frame corresponding to the IDR frame) is inserted at regular intervals whenever the encoder generates the bitstream. The IDR frame is represented as nal_unit_type 5 of a network adaptation layer (NAL) unit in the bitstream. Immediately before encoding the IDR frame, the encoder resets the DPB, and performs encoding by using only reconstructed pictures after the IDR frame, without referring to reconstructed pictures before the IDR frame, when encoding P or B frame after the IDR frame. When the encoder resets the DPB in such a manner, the decoder checks only nal_unit_type of the NAL unit on the bitstream. When nal_unit_type is the IDR frame, the decoder may reconstruct pictures by starting decoding from the IDR frame. If the decoder starts decoding from the IDR frame appearing in the middle, the decoding is started in such a state that no reconstructed pictures are stored in the DPB. Therefore, the DPB is reset from the start of encoding upon the generation of the IDR frame in consideration of the state of the decoder.

On the other hand, in the case where the encoding is performed by inserting the IDR frame so as to support the random access function, the random access is enabled in the decoder. However, as described above, the insertion of the IDR frame degrades the picture quality. The picture quality of the I frame is substantially equal to the picture quality of the IDR frame. However, the picture quality in the subsequent frames is changed due to a difference of reference pictures. The problems caused by the use of the IDR frame may be solved by the following embodiments.

In an embodiment of the present disclosure, instead of the conventional IDR picture, a new encoding picture type corresponding to the IDR picture is defined as refresh (R) picture, and technical details are proposed to solve the problems occurring in the conventional H.264/AVC. The R picture is merely the term and symbol for describing the contents of the present disclosure, and does not limit the technical contents of the present disclosure.

Figure 7:
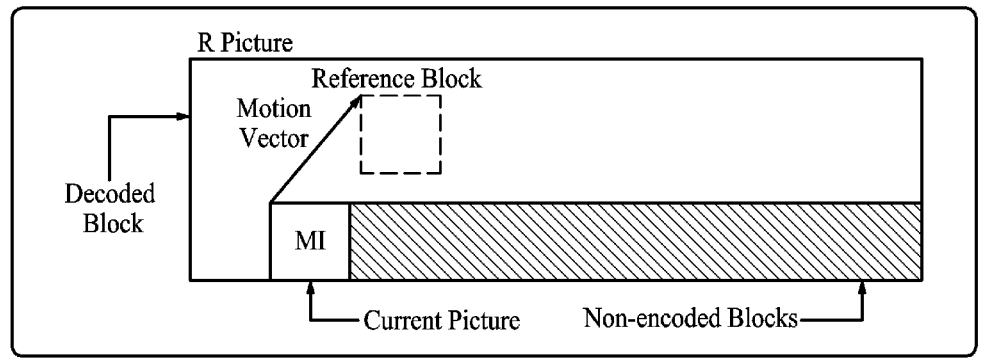
FIG. 7 is a diagram explaining an MI block prediction method according to an embodiment of the present disclosure.

The R picture is a picture type for supporting random access and is a reference picture for random access. That is, an encoder or a decoder may perform encoding or decoding from arbitrary R picture. To this end, as in the case of the conventional I picture or IDR picture, blocks constituting the R picture are generally encoded or decoded by using only intra-prediction, without using inter-prediction referring to other pictures. Alternatively, in order to increase the encoding efficiency, a moving intra (MI) block may be used as illustrated in FIG. 7.

The MI block searches blocks similar to a current block within a single picture or slice, represents position information by using a motion vector, transmits the position information, and transmits pixels of each block subtracted using Equation 1 below.

In this case, there is no limitation in using the decoded blocks as reference blocks by applying a specific interpolation filter within the current picture or slice so as to search the optimal block.

$$r_{MI} = C_{MI} - R_{MI}$$ Equation 1

In Equation 1 above, CMI and RMI represent a pixel value of the current block and a pixel value of the reference block, respectively, and rMI represents a residue value obtained by subtraction of the pixel values of the two blocks. The residue signal is transmitted through a transform and quantization process. The description related to FIG. 7 is merely an exemplary embodiment for encoding the R picture. An I picture encoding method in the conventional H.264/AVC may be used. In this present disclosure, there is no limitation to an R picture encoding method.

The R picture proposed in the embodiment of the present disclosure efficiently manages a reference picture list, increases the encoding efficiency of pictures adjacent to the R picture in display order, and supports a random access function. In order to efficiently explain the R picture function, the terms of pictures influencing the encoding efficiency due to the use of the R picture are summarized as illustrated in FIG. 8.

Figure 8:
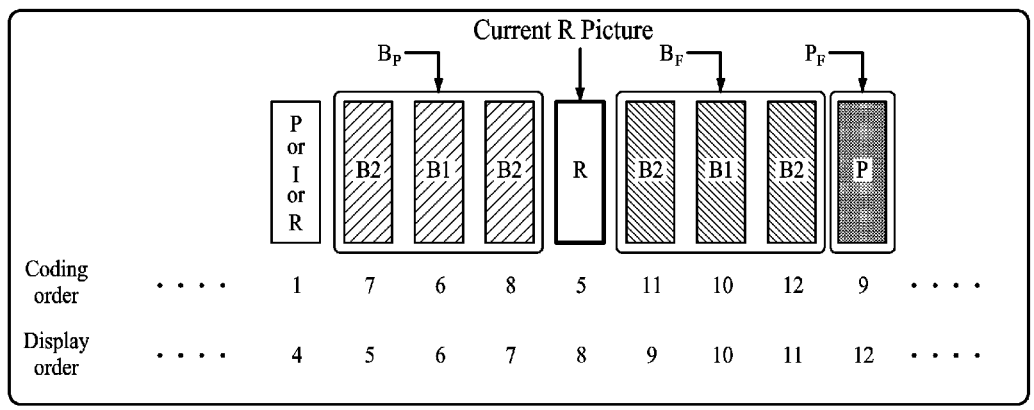
FIG. 8 is a diagram explaining an R picture function and defining terms of pictures according to an embodiment of the present disclosure.

In FIG. 8, B pictures existing among past P, I or R pictures closest to the current R picture in display order are defined BP, and B or P pictures existing after the R picture in display order and using the decoded current R picture as the reference picture are defined as BF and PF, respectively.

Figure 9:
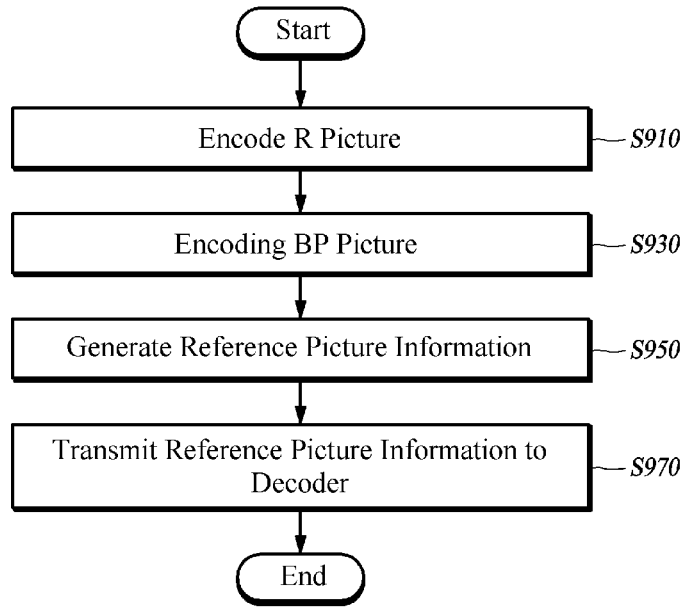
FIG. 9 is a flow chart illustrating a video encoding method using inter-prediction according to a first embodiment of the present disclosure.

FIG. 9 is a flow chart illustrating a video encoding method using inter-prediction according to a first embodiment of the present disclosure.

Referring to FIG. 9, R picture as a first picture, which serves as a reference for random access, is encoded (S910). A block included in B picture (for example, BP picture of FIG. 8) as a second picture, which is displayed before the R picture, is inter-prediction encoded by using a plurality of reference pictures (S930).

In addition, reference picture information is generated (S950). The reference picture information (for example, syntax of Table 1) represents whether past picture (for example, modified reference picture of the decoded R picture of FIG. 15), which is displayed before the B picture, is used as the reference picture for encoding the B picture. In step S930, when the past reference picture is used for encoding the B picture, the reference picture information may be information representing the past reference picture. In addition, in the case of using the past reference picture for encoding the B picture, at least after the encoding of the B picture, the encoder may delete reference pictures encoded before the encoding of the R picture, again decoded and then stored in a memory.

Then, as described above, the encoded R picture, the encoded B picture, and the reference picture information are transmitted to the decoder (S970).

Figure 10:
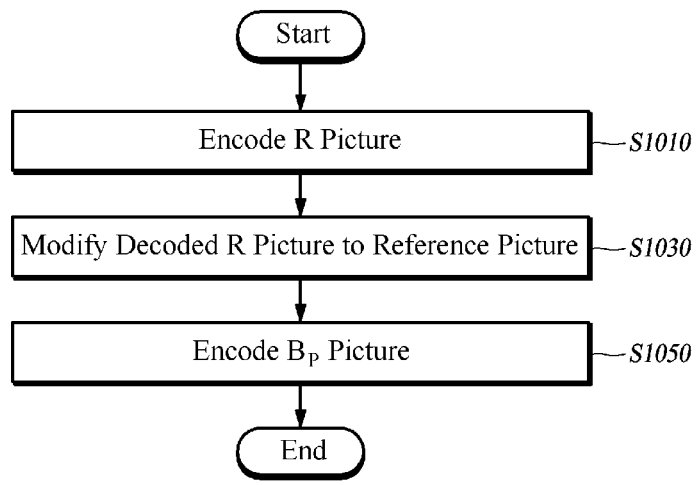
FIG. 10 is a flow chart illustrating a video encoding method using inter-prediction according to a second embodiment of the present disclosure.

FIG. 10 is a flow chart illustrating a video encoding method using inter-prediction according to a second embodiment of the present disclosure.

Referring to FIG. 10, R picture as a first picture, which serves as a reference for random access, is encoded (S1010). The encoded R picture is decoded, and a plurality of pictures obtained by modifying the decoded R picture is generated as reference picture (S1030).

Then, a block included in B picture (for example, BP picture of FIG. 8) as a second picture, which is displayed before the R picture, is inter-prediction encoded by using a plurality of reference pictures (S1050).

In addition, modification identification information representing a type of the modified decoded R picture is generated in step S1030. After step S1050, the encoded R picture, the encoded B picture, and the modification identification information are transmitted to the decoder. Moreover, although not illustrated, information on the reference picture generated in step S1030 may be generated in correspondence to the processes of steps S950 and S970 of FIG. 9, and the reference picture information may be transmitted to the decoder.

Figure 11:
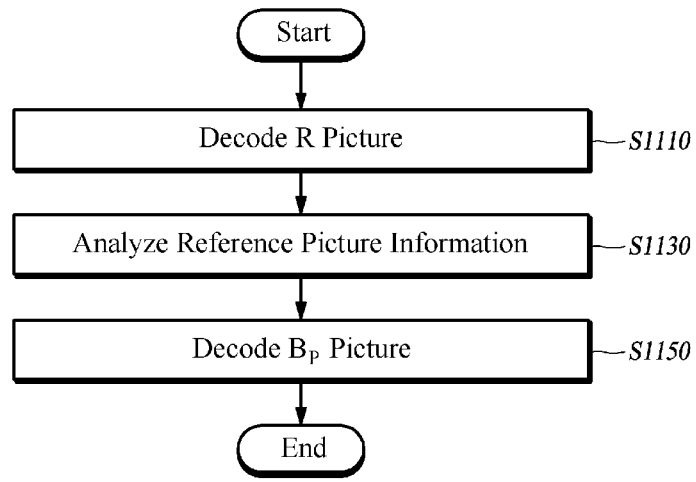
FIG. 11 is a flow chart illustrating a video decoding method using inter-prediction according to a third embodiment of the present disclosure.

FIG. 11 is a flow chart illustrating a video decoding method using inter-prediction according to a third embodiment of the present disclosure.

Referring to FIG. 11, R picture as a first picture, which serves as a reference for random access, is decoded (S1110), and reference picture information received from the encoder is analyzed (S1130).

Then, a block included in B picture (for example, BP picture of FIG. 8) as a second picture, which is displayed before the R picture, is inter-prediction decoded by using a plurality of reference pictures, and a process of decoding the block included in the B picture is performed based on the reference picture information representing whether past picture, which is displayed before the B picture, is used as the reference picture for encoding the B picture (S1150).

Figure 12:
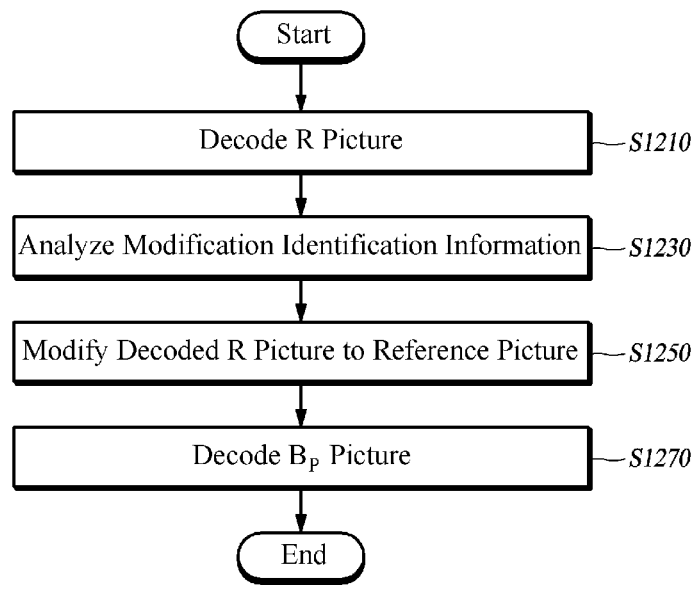
FIG. 12 is a flow chart illustrating a video decoding method using inter-prediction according to a fourth embodiment of the present disclosure.

FIG. 12 is a flow chart illustrating a video decoding method using inter-prediction according to a fourth embodiment of the present disclosure.

Referring to FIG. 12, R picture as a first picture, which serves as a reference for random access, is decoded (S1210), and modification identification information representing a modification type of the decoded R picture is analyzed (S1230).

Then, a plurality of reference pictures are generated by modifying the decoded R picture according to the analyzed modification identification information (S1250), and a block included in B picture (for example, BP picture of FIG. 8) as a second picture, which is displayed before the R picture, is inter-prediction decoded by using the plurality of reference pictures (S1270).

Figure 13:
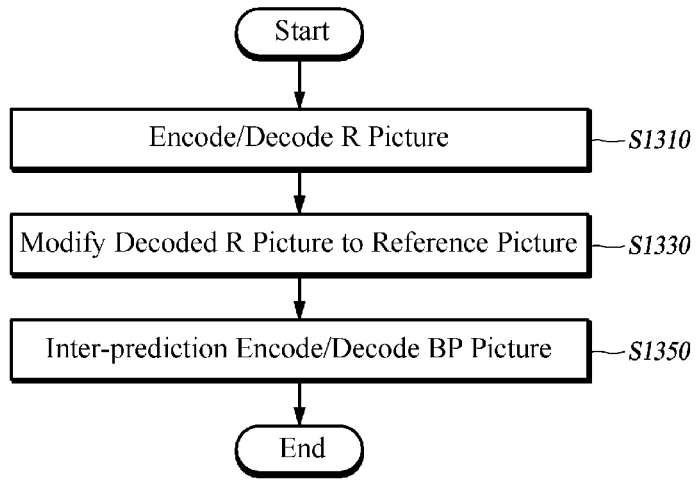
FIG. 13 is a flow chart illustrating an inter-prediction method according to a fifth embodiment of the present disclosure.

FIG. 13 is a flow chart illustrating an inter-prediction method according to a fifth embodiment of the present disclosure.

Referring to FIG. 13, R picture as a first picture, which serves as a reference for random access, is encoded or decoded (S1310), and a plurality of reference pictures are generated by modifying the decoded R picture (the R picture encoded in the encoder and then decoded, or the R picture decoded in the decoder) step by step (S1330).

Regarding the process of step S1330, the encoder performs the same process as step S1030 of FIG. 10, and the decoder performs the same process as steps S1230 to S1250.

After encoding or decoding the R picture, a block included in B picture (for example, BP picture of FIG. 8) as a second picture, which is displayed before the R picture, is inter-prediction encoded or decoded by using the plurality of reference pictures (S1350).

Figure 14:
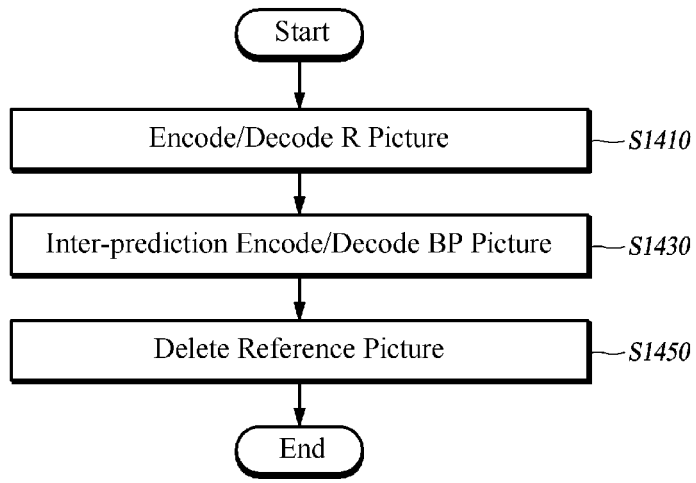
FIG. 14 is a flow chart illustrating an inter-prediction method according to a sixth embodiment of the present disclosure.

FIG. 14 is a flow chart illustrating an inter-prediction method according to a sixth embodiment of the present disclosure.

Referring to FIG. 14, R picture as a first picture, which serves as a reference for random access, is encoded or decoded (S1410). After decoding the R picture, a block included in B picture (for example, BP picture of FIG. 8) as a second picture, which is displayed before the R picture, is inter-prediction encoded or decoded by using the plurality of reference pictures (S1430).

Then, in the case of using past reference picture for encoding or decoding the B picture, after the encoding or decoding of the B picture is completed, reference pictures encoded before the encoding of the R picture, again decoded and then stored in a memory or reference pictures decoded before the decoding of the R picture and stored in a memory are deleted (S1450).

Figure 15:
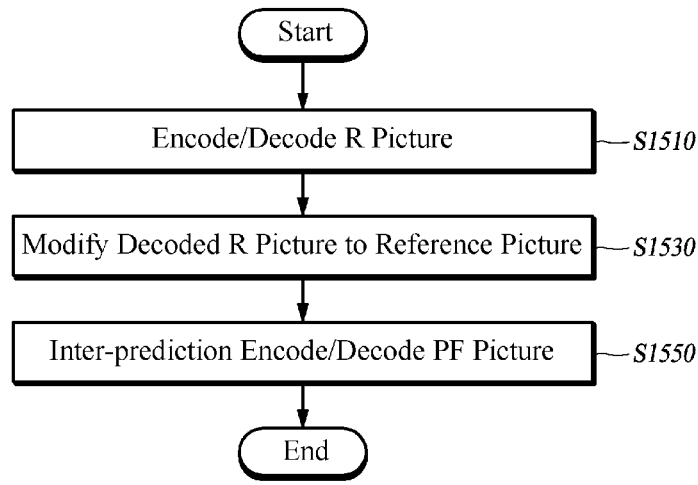
FIG. 15 is a flow chart illustrating an inter-prediction method according to a seventh embodiment of the present disclosure.

FIG. 15 is a flow chart illustrating an inter-prediction method according to a seventh embodiment of the present disclosure.

Referring to FIG. 15, R picture as a first picture, which serves as a reference for random access, is encoded or decoded (S1510), and a plurality of reference pictures are generated by modifying the decoded R picture (the R picture encoded in the encoder and then decoded, or the R picture decoded in the decoder) step by step (S1530).

Regarding the process of step S1530, the encoder performs the same process as step S1030 of FIG. 10, and the decoder performs the same process as steps S1230 to S1250.

After encoding or decoding the R picture, a block included in P picture (for example, PP picture of FIG. 8) as a second picture, which is displayed after the R picture, is inter-prediction encoded or decoded by using at least one of the plurality of reference pictures (S1550).

Figure 16:
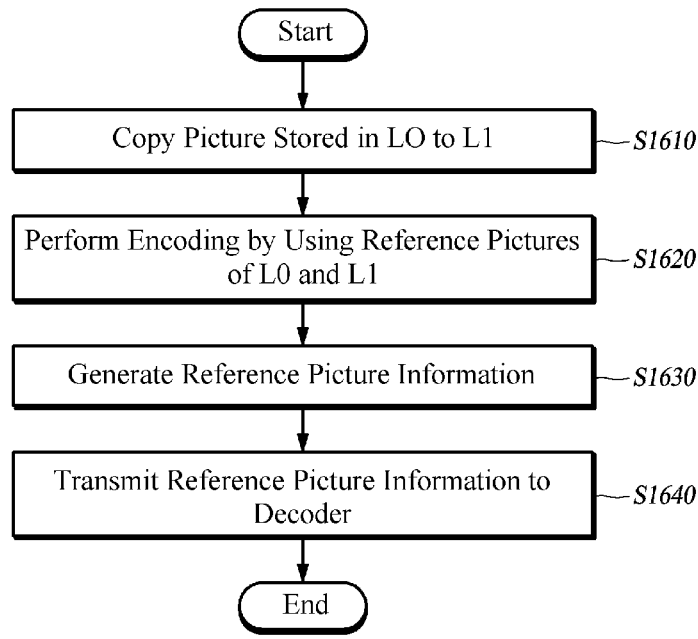
FIG. 16 is a flow chart illustrating a video encoding method using inter-prediction according to an eighth embodiment of the present disclosure.

FIG. 16 is a flow chart illustrating a video encoding method using inter-prediction according to an eighth embodiment of the present disclosure. Referring to FIG. 16, after past reference pictures are selected from a memory (list 0 DPB, L0) storing past reference pictures displayed before the current picture, the selected reference pictures are copied to a memory (list 1 DPB, L1) storing future reference pictures displayed after the current picture (S1610). Then, the current picture is prediction-encoded by using the reference pictures stored in the memories L0 and L1 (S1620). In this case, the current picture is B picture.

In next step, reference picture information (for example, syntax of Table 1) used as the reference picture for the encoding of the current picture is generated (S1630). In step S1630, either or both of the past reference picture and the future reference picture may be used for the encoding of the current picture. Then, as described above, the encoded current picture and the reference picture information are transmitted to the decoder (S1640).

Figure 17:
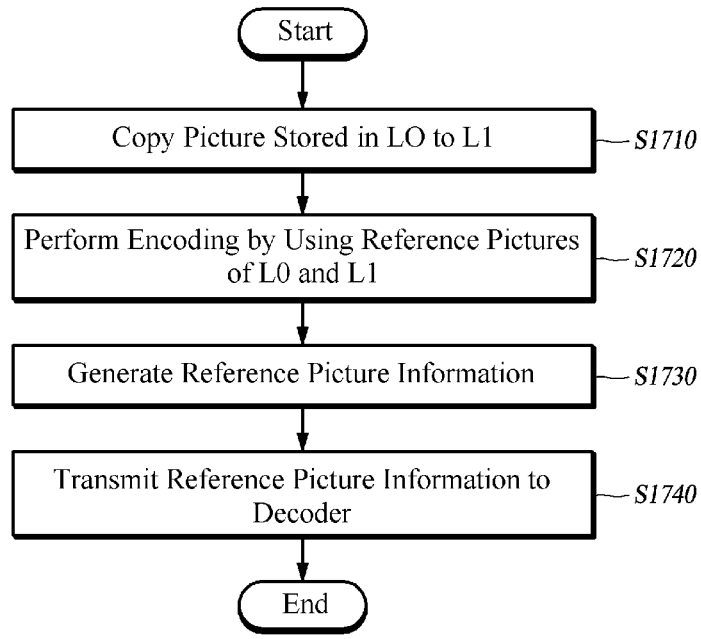
FIG. 17 is a flow chart illustrating a video encoding method using inter-prediction according to a ninth embodiment of the present disclosure.

FIG. 17 is a flow chart illustrating a video encoding method using inter-prediction according to a ninth embodiment of the present disclosure. Referring to FIG. 17, after future reference pictures are selected from a memory (list 1 DPB, L1) storing future reference pictures displayed after the current picture, the selected future reference pictures are copied to a memory (list 0 DPB, L0) storing past reference pictures displayed before the current picture (S1710). Then, the current picture is prediction-encoded by using the reference pictures stored in the memories L0 and L1 (S1720). In this case, the current picture is B picture.

In next step, reference picture information (for example, syntax of Table 1) used as the reference picture for the encoding of the current picture is generated (S1730). In step S1730, either or both of the past reference picture and the future reference picture may be used for the encoding of the current picture. Then, as described above, the encoded current picture and the reference picture information are transmitted to the decoder (S1740).

Figure 18:
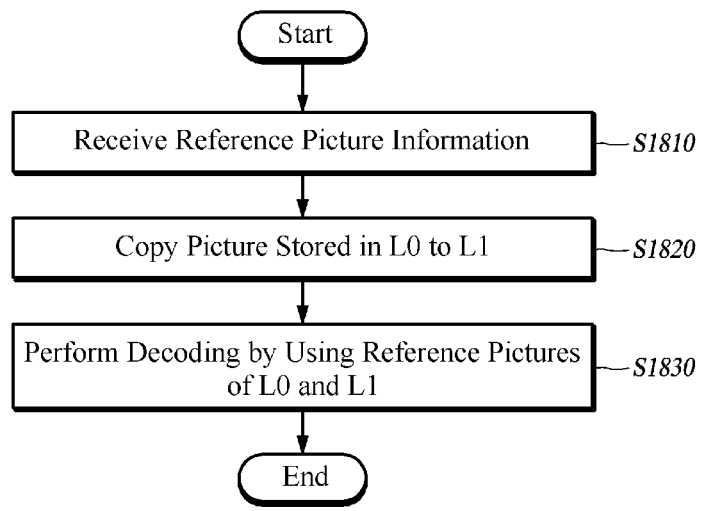
FIG. 18 is a flow chart illustrating a video decoding method using inter-prediction according to a tenth embodiment of the present disclosure.

FIG. 18 is a flow chart illustrating a video decoding method using inter-prediction according to a tenth embodiment of the present disclosure. Referring to FIG. 18, a received signal for current picture is decoded (S1810), and reference picture information received from an encoder is analyzed. Then, some pictures are selected from a memory (list 0 DPB, L0) storing past reference pictures displayed before the current picture, and the selected reference pictures are copied to a memory (list 1 DPB, L1) storing future reference pictures displayed after the current picture (S1820). An inter-prediction decoding is performed by using blocks included in the pictures stored in the memories L0 and L1, based on reference picture information representing which picture is used as the reference picture for encoding (S1830).

Figure 19:
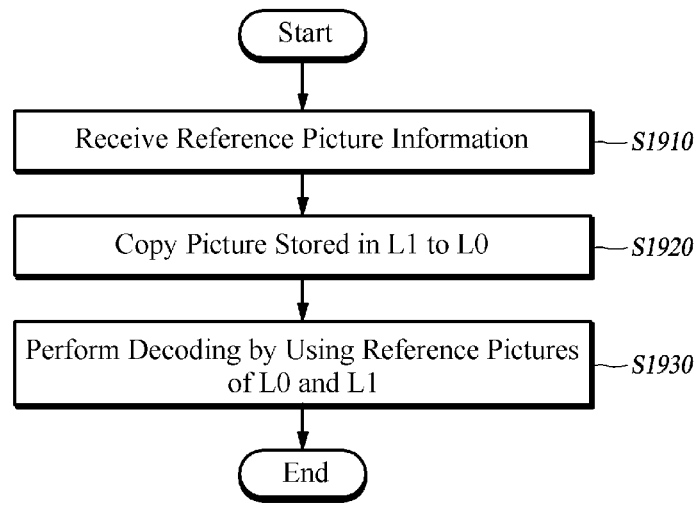
FIG. 19 is a flow chart illustrating a video decoding method using inter-prediction according to an eleventh embodiment of the present disclosure.

FIG. 19 is a flow chart illustrating a video decoding method using inter-prediction according to an eleventh embodiment of the present disclosure. Referring to FIG. 19, a received signal for current picture is decoded (S1910), and reference picture information received from an encoder is analyzed. Then, some pictures are selected from a memory (list 1 DPB, L1) storing future reference pictures displayed after the current picture, and the selected reference pictures are copied to a memory (list 0 DPB, L0) storing past reference pictures displayed before the current picture (S1920). An inter-prediction decoding is performed by using blocks included in the pictures stored in the memories L0 and L1, based on reference picture information representing which picture is used as the reference picture for encoding (S1930).

Figure 20:
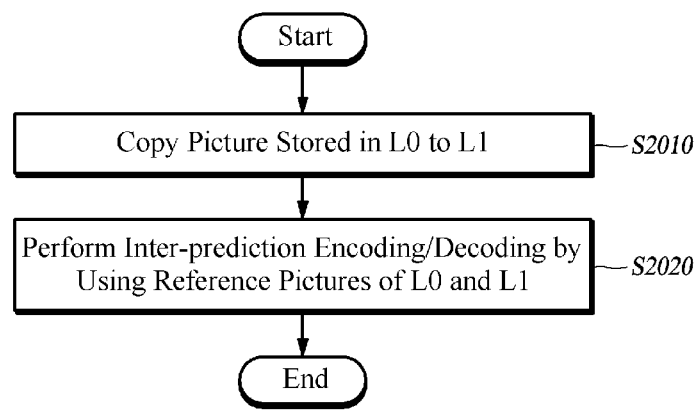
FIG. 20 is a flow chart illustrating an inter-prediction method according to a twelfth embodiment of the present disclosure.

FIG. 20 is a flow chart illustrating an inter-prediction method according to a twelfth embodiment of the present disclosure. Referring to FIG. 20, after past reference pictures are selected from a memory (list 0 DPB, L0) storing past reference pictures displayed before the current picture, the selected reference pictures are copied to a memory (list 1 DPB, L1) for the future reference pictures displayed after the current picture (S2010). Then, the current picture is prediction-encoded and prediction-decoded by using the reference pictures stored in the memories L0 and L1 (S2020). In this case, the current picture is P picture or B picture. In step S2020, either or both of the past reference picture and the future reference picture may be used for the encoding and decoding of the current picture.

Figure 21:
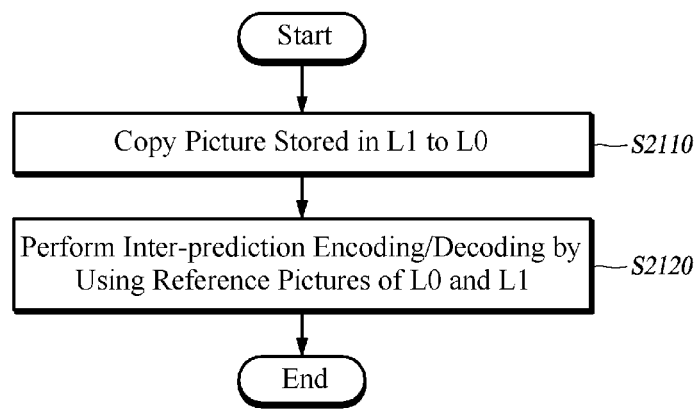
FIG. 21 is a flow chart illustrating an inter-prediction method according to a thirteenth embodiment of the present disclosure.

FIG. 21 is a flow chart illustrating an inter-prediction method according to a thirteenth embodiment of the present disclosure. Referring to FIG. 21, after future reference pictures are selected from a memory (list 1 DPB, L1) storing future reference pictures displayed after the current picture, the selected reference pictures are copied to a memory (list 0 DPB, L0) storing past reference pictures displayed before the current picture (S2110). Then, the current picture is prediction-encoded and prediction-decoded by using the reference pictures stored in the memories L0 and L1 (S2120). In this case, the current picture is B picture. In step S2120, either or both of the past reference picture and the future reference picture may be used for the encoding and decoding of the current picture.

Hereinafter, various examples of detailed technologies for implementing the first to thirteenth embodiments of the present disclosure will be described with reference to FIGS. 22 to 27.

According to the embodiment of the present disclosure, R picture or R picture slice header may include a syntax (in this embodiment, referred to as reference picture information and modification identification information) as shown in Table 1 below.

TABLE 1 past_pic_ref_type,
if(past_pic_ref_type==1){,
    past_L0_R_pic_process_type,
},
past_L1_R_pic_process_type,
fut_L0_R_pic_process_type, The function of the syntax of Table 1 will be described below.

1) past_pic_ref_type past_pic_ref_type is a syntax element that represents whether past reference picture is used for encoding $B_P$ and/or, if used, which past reference picture is used. A value of past_pic_ref_type may be determined in the range of 0 to 2, and the picture affected by the value of past_pic_ref_type is $B_P$. An example of the function of the encoder or the decoder according to the value of past_pic_ref_type determined in the range of 0 to 2 will be described below.

When the value of past_pic_ref_type is 0, the encoder or the decoder uses (decoded) pictures of time point prior to $B_P$, based on display order, as past reference picture (List 0 reference picture) of $B_P$. To this end, when the value of this syntax element is 0, the decoder does not delete the already decoded pictures stored in the DPB, but continuously stores the decoded pictures until a predetermined time point and then deletes the decoded pictures. For example, immediately after decoding all or some of the pictures, whose display order is later than the R picture, among the pictures decoded after the R picture, pictures decoded before the R picture and stored in the DPB may be deleted.

When the value of past_pic_ref_type is 1, the encoder or the decoder deletes the already decoded pictures stored in the DPB, modifies the decoded current R picture, and stores the modified R picture in the DPB so as to use the modified R picture as the past reference picture.

When the value of past_pic_ref_type is 2, the encoder or the decoder deletes the already decoded pictures stored in the DPB. Only pictures (decoded pictures) of time point after BP, based on display order, that is, only the future reference pictures (List 1 reference pictures) of BP, are stored in the DPB so as to use the reference pictures as the reference pictures for encoding or decoding $B_P$.

2) past_L0_R_pic_process_type past_L0_R_pic_process_type is a syntax element that is encoded only when the value of past_pic_ref_type is 1, and represents a method of modifying a decoded current R picture. A value of past_L0_R_pic_process_type may be determined in the range of 0 to 3, and the corresponding picture is $B_P$. An example of the function of the encoder or the decoder according to the value of past_L0_R_pic_process_type determined in the range of 0 to 3 will be described below.

When the value of past_L0_R_pic_process_type is 0, the encoder or the decoder applies a low pass filtering (LPF) process to the decoded current R picture step by step and then uses the LPF-processed R picture as the past reference picture of $B_P$.

When the value of past_L0_R_pic_process_type is 1, the encoder or the decoder applies a zoom-in process to the decoded current R picture step by step and then uses the zoomed-in R picture as the past reference picture of $B_P$.

When the value of past_L0_R_pic_process_type is 2, the encoder or the decoder applies a zoom-out process to the decoded current R picture step by step and then uses the zoomed-out R picture as the past reference picture of $B_P$.

When the value of past_L0_R_pic_process_type is 3, the encoder or the decoder applies a brightness adjustment process to the decoded current R picture step by step and then uses the brightness-adjusted R picture as the past reference picture of $B_P$.

3) past_L1_R_pic_process_type past_L1_R_pic_process_type is a syntax element that represents future reference picture used for encoding or decoding BP. A value of past_L1_R_pic_process_type may be determined in the range of 0 to 4, and the corresponding picture is $B_P$. An example of the function of the encoder or the decoder according to the value of past_L1_R_pic_process_type will be described below.

When the value of past_L1_R_pic_process_type is 0, the encoder or the decoder uses only the decoded current R picture as the future reference picture (List 1 reference picture) of $B_P$, without modifying the R picture.

When the value of past_L1_R_pic_process_type is 1, the encoder or the decoder uses the decoded current R picture and the pictures, which are obtained by applying the LPF process to the decoded current R picture step by step, as the future reference picture of $B_P$.

When the value of past_L1_R_pic_process_type is 2, the encoder or the decoder uses the decoded current R picture and the pictures, which are obtained by applying the zoom-in process to the decoded current R picture step by step, as the future reference picture of $B_P$.

When the value of past_L1_R_pic_process_type is 3, the encoder or the decoder uses the decoded current R picture and the pictures, which are obtained by applying the zoom-out process to the decoded current R picture step by step and, as the future reference picture of $B_P$.

When the value of past_L1_R_pic_process_type is 4, the encoder or the decoder uses the decoded current R picture and the pictures, which are obtained by applying the brightness adjustment process to the decoded current R picture step by step, as the future reference picture of $B_P$.

4) fut_L0_R_pic_process_type fut_L0_R_pic_process_type is a syntax element that represents past reference picture used for encoding or decoding $B_F$ or $P_F$. A value of fut_L0_R_pic_process_type may be determined in the range of 0 to 4, and the corresponding picture is BF. An example of the function of the encoder or the decoder according to the value of fut_L0_R_pic_process_type will be described below.

When the value of fut_L0_R_pic_process_type is 0, the encoder or the decoder uses only the decoded current R picture as the past reference picture of BF or PF, without modifying the R picture.

When the value of fut_L0_R_pic_process_type is 1, the encoder or the decoder uses the decoded current R picture and the pictures, which are modified by applying the LPF process to the decoded current R picture step by step, as the past reference picture of $B_F$ or $P_F$.

When the value of fut_L0_R_pic_process_type is 2, the encoder or the decoder uses the decoded current R picture and the pictures, which are modified by applying the zoom-in process to the decoded current R picture step by step, as the past reference picture of $B_F$ or $P_F$.

When the value of fut_L0_R_pic_process_type is 3, the encoder or the decoder uses the decoded current R picture and the pictures, which are modified by applying the zoom-out process to the decoded current R picture step by step, as the past reference picture of $B_F$ or $P_F$.

When the value of fut_L0_R_pic_process_type is 4, the encoder or the decoder uses the decoded current R picture and the pictures, which are modified by applying the brightness adjustment process to the decoded current R picture step by step, as the past reference picture of $B_F$ or $P_F$.

Various embodiments, including at least the first to thirteenth embodiments of FIGS. 9 to 21, may be implemented by combinations of the above-described syntaxes.

Figure 22:
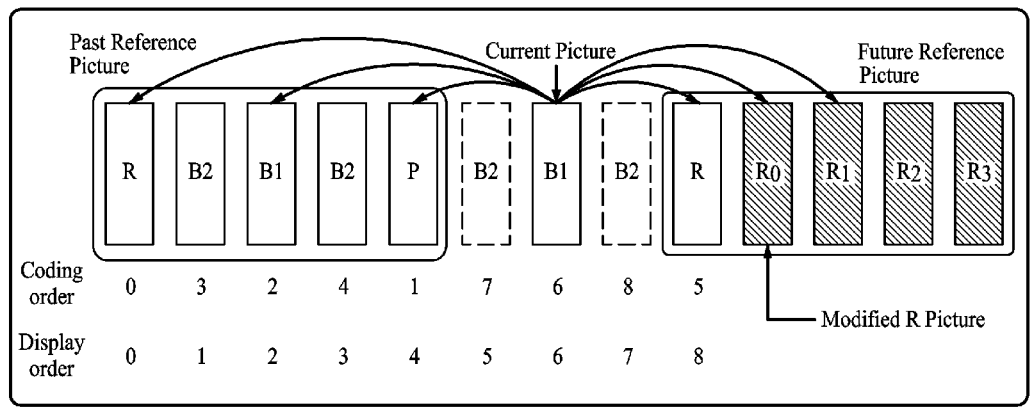
FIG. 22 is a diagram explaining a first example of a syntax combination according to an embodiment of the present disclosure.

As one example of the combinations of the above-described syntaxes, when the value of past_pic_ref_type is 0 and the value of past_L1_R_pic_process_type is in the range of 1 to 4, B pictures belonging to BP are encoded or decoded as illustrated in FIG. 22.

Figure 23:
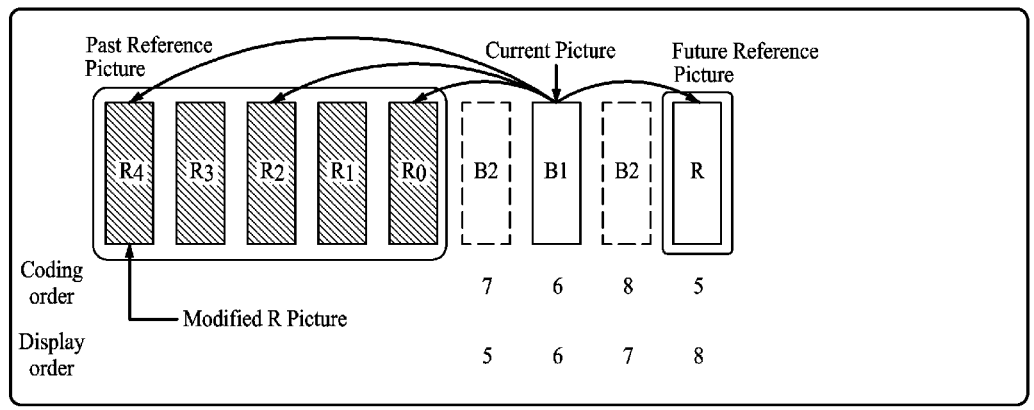
FIG. 23 is a diagram explaining a second example of a syntax combination according to an embodiment of the present disclosure.

As another example of the combinations of the above-described syntaxes, when the value of past_pic_ref_type is 1; the value of past_L0_R_pic_process_type is in the range of 0 to 3; and the value of past_L1_R_pic_process_type is 0, pictures belonging to BP are encoded or decoded as illustrated in FIG. 23.

Figure 24:
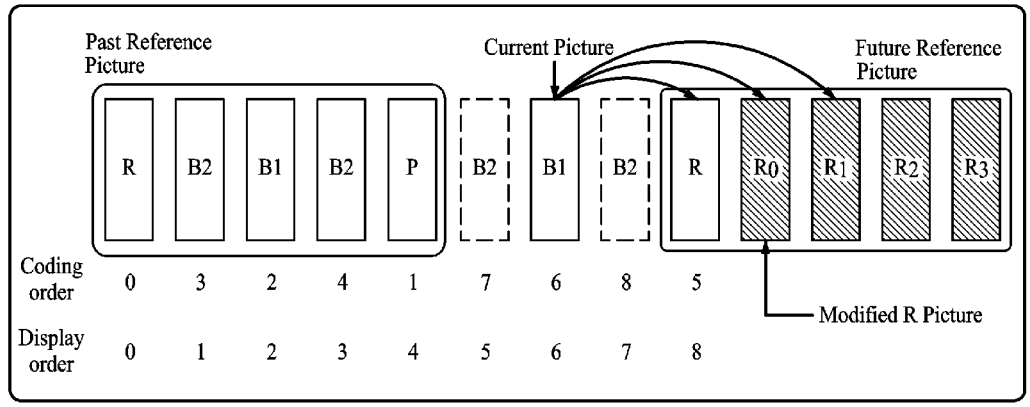
FIG. 24 is a diagram explaining a third example of a syntax combination according to an embodiment of the present disclosure.

As yet another example of the combinations of the above-described syntaxes, when the value of past_pic_ref_type is 2 and the value of past_L1_R_pic_process_type is in the range of 1 to 4, B pictures belonging to $B_P$ are encoded or decoded as illustrated in FIG. 24.

Figure 25:
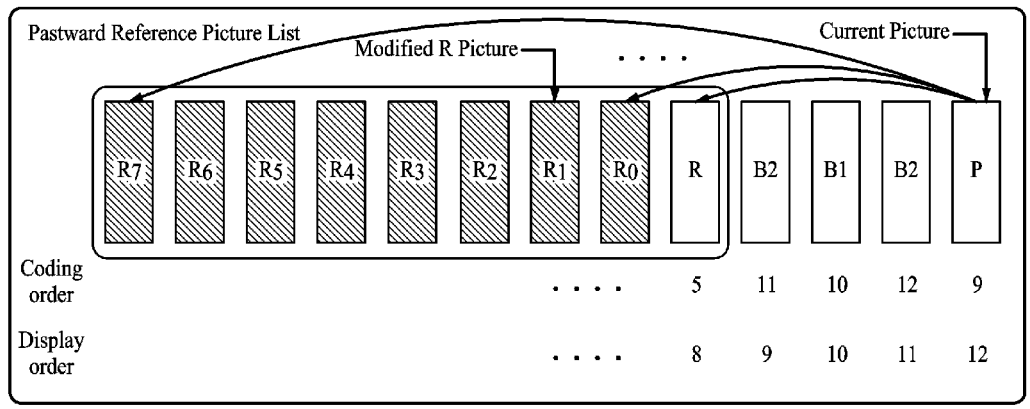
FIG. 25 is a diagram explaining a fourth example of a syntax combination according to an embodiment of the present disclosure.

As still another example of the combinations of the above-described syntaxes, when the value of fut_L0_R_pic_process_type is in the range of 1 to 4, B or P pictures belonging to $B_F$ or $P_F$ are encoded or decoded as illustrated in FIG. 25.

The LPF process, the zoom-in process, the zoom-out process, and the brightness adjustment process used in past_L0_R_pic_process_type, past_L1_R_pic_process_type, and fut_L0_R_pic_rocess_type may be applied step by step according to the temporal distance of display order from the current picture. As the temporal distance of the display order is closer, the modification may be performed with a slight level, and as the temporal distance of the display order is farther, the R modification may be performed with a strong level.

In this case, there is no limitation to the strong-level R picture modification as the distance is closer and the slight-level modification as the distance is farther, depending on the temporal distance of the display order.

According to the above-described embodiment, the encoder and the decoder manage the memory, that is, the DPB, in the same manner. Therefore, by using the same reference pictures stored in the DPB, the encoder encodes each picture and the decoder decodes each picture.

In the above-described embodiment, the encoder selects the values of the syntax elements, such as past_pic_ref_type, past_L0_R_pic_process_type, past_L1_R_pic_process_ype or fut_L0_R_pic_process_type, by using an appropriate method, and inserts the syntax elements to the picture header or the slice header of the syntax elements, or other suitable bitstream layer. The decoder parses the syntax elements and performs a relevant operation according to the values of the respective syntax elements.

In the above-described embodiment, new syntax elements for controlling the operation of the decoder have been introduced. However, according to another embodiment of the present disclosure, the above-described problem of the conventional IDR picture may be solved in a simpler manner by operating the encoder and the decoder in the same manner according to a predefined algorithm, without introduction of the syntax element such as past_pic_ref_type. For example, in the above-described embodiment, various DPB managements can be performed according to the value of past_pic_ref_type. In another embodiment, instead of transmitting past_pic_ref_type, the function corresponding to the case where the value of past_pic_ref_type is 0 may be performed in the same manner by the encoder and the decoder.

In addition, in the embodiment of the present disclosure, although the method of modifying the decoded R picture is designated according to the value of each syntax, the 1:1 correspondence of the value and the corresponding modifying method may be changed according to a predefined rule.

The number of steps of modifying all decoded R pictures may be determined according to the number of reference pictures set by the user.

Although the method of modifying all R pictures has been applied in units of pictures or slices in the embodiments of the present disclosure, there is no limitation to applying the method of modifying the R picture transmitted from the slice header in units of blocks.

Figure 26:
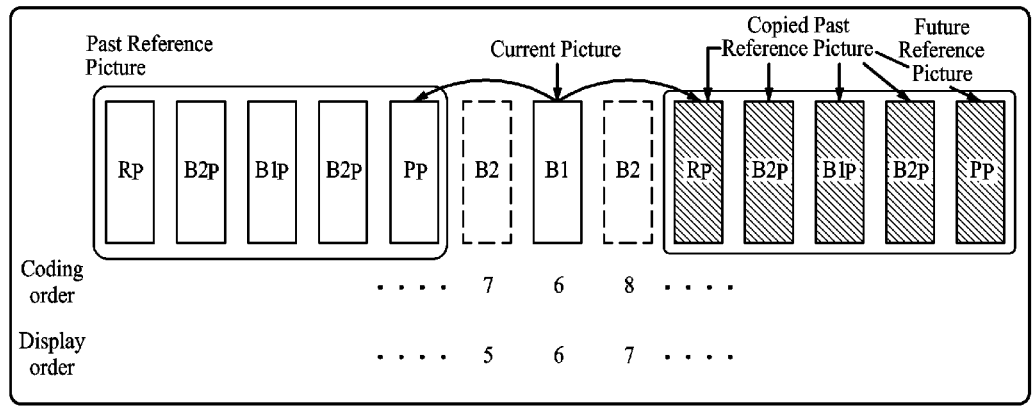
FIG. 26 is a diagram explaining a sixth example of a syntax combination according to an embodiment of the present disclosure.

In addition, as illustrated in FIG. 26, when encoding and decoding the current picture B1, a specific frame, all frames or some frames among the past reference pictures R, B2, B1, B2 and P may be copied to a future reference picture buffer, and may be used for prediction encoding and decoding of the current picture B1.

Figure 27:
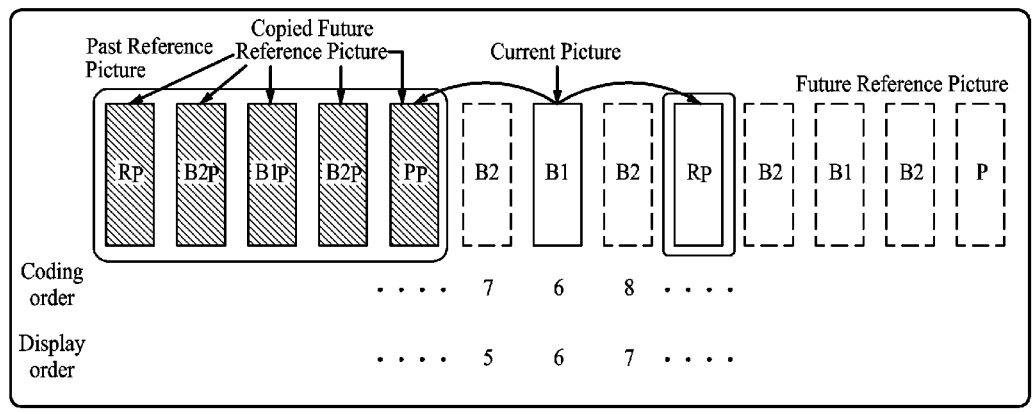
FIG. 27 is a diagram explaining a seventh example of a syntax combination according to an embodiment of the present disclosure.

In addition, as illustrated in FIG. 27, when encoding and decoding the current picture B1, a specific frame, all frames or some frames among the future reference pictures may be copied to a past reference picture buffer, and may be used for prediction encoding and decoding of the current picture B1.

According to the embodiment of the present disclosure, in order to use the decoded pictures existing before the BP pictures (in display order) or the modified decoded current R picture as the reference picture of the BP pictures of FIG. 8, the syntax is added to the slice header. However, there is no limitation to encoding the corresponding BP pictures by using only one predefined method.

In addition, when the decoded current R picture is modified and used as the reference picture of BF and PF pictures, the syntax is added to the slice header in order to encode the modifying method. However, there is no limitation to encoding the BF or PF pictures by using only one predefined method.

In addition, in the embodiments of the present disclosure, there is no limitation to a type, size, or order of a filter used for modifying the decoded R picture.

In addition, in the embodiments of the present disclosure, there is no limitation to the zoom-in method and the picture/block interpolation method, which are used for modifying the decoded R picture.

In addition, in the embodiments of the present disclosure, there is no limitation to the zoom-out method and the picture/block interpolation and sampling method, which are used for modifying the decoded R picture.

In addition, in the embodiments of the present disclosure, there is no limitation to the brightness change method and the number of brightness change parameters, which are used for modifying the decoded R picture.

Moreover, in the embodiments of the present disclosure, the decoded current R picture is copied or modified so as to be used for the reference pictures of the BF and PF pictures. However, there is no limitation to the copy or modification of an arbitrary type of the reference picture.

Although exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields because various embodiments are applied to the video encoding/decoding technology to solve the problems during the use of the IDR picture for the random access, thereby improving the encoding and decoding efficiency.

The invention claimed is:

1. A video encoding method using inter-prediction, comprising:
    encoding a first picture, wherein the first picture serves as a random access picture and is encoded without referring to a reference picture which has already encoded and then decoded;
    inter-prediction encoding a block included in a second picture, which is encoded after the first picture and displayed before the first picture, by using a plurality of reference pictures;
    generating reference picture information representing whether one or more past pictures, which are encoded before the first picture and displayed before the first picture, are used as reference pictures for encoding the second picture; and
    transmitting the encoded first and second pictures and the reference picture information,
    wherein, when the one or more past pictures are used as the reference pictures for encoding the second picture, the one or more past pictures are deleted from a memory after encoding at least the second picture.

2. The video encoding method of claim 1, wherein when the past pictures are used for encoding the second picture, the reference picture information is information representing the past pictures.

3. The video encoding method of claim 1, wherein when encoding the second picture displayed before the first picture, in the case where past pictures prior to the current second picture are stored in a memory storing reference pictures, the stored past pictures are copied to a memory storing future reference pictures of the current second picture and are used as future reference pictures.

4. The video encoding method of claim 1, wherein in the case where future pictures after a current second picture are stored in a memory storing reference pictures, the stored future reference pictures are copied to a memory storing past pictures of the current second picture and are used as past reference pictures of the current second picture.

5. The video encoding method of claim 1, wherein the first picture is R picture corresponding to IDR picture, and the second picture is B picture or P picture.

6. A video decoding method using inter-prediction, comprising:
    decoding a first picture, wherein the first picture serves as a random access picture and is a picture encoded without referring to a reference picture which has already encoded and then decoded; and
    inter-prediction decoding a block included in a second picture, which is decoded after the first picture and displayed before the first picture, by using a plurality of reference pictures,
    wherein the decoding of the block included in the second picture is performed based on reference picture information representing whether one or more past pictures, which are encoded before the first picture and displayed before the first picture, are used as reference pictures for encoding the second picture,
    wherein, when the one or more past pictures are used for decoding the second picture, the one or more past pictures are deleted from a memory after decoding at least the second picture.

7. The video decoding method of claim 6, wherein when decoding the second picture displayed before the first picture, in the case where past pictures before a current second picture are stored in a memory storing reference pictures, the stored past pictures are copied to a memory storing future reference pictures of the current second picture and are used as future reference pictures.

8. The video decoding method of claim 6, wherein when future pictures after a current second picture are stored in a memory storing reference pictures, and stored future reference pictures are copied to a memory storing past pictures of the current second picture and are used as past reference pictures of the current second picture.

9. The video decoding method of claim 6, wherein the first picture is R picture corresponding to IDR picture, and the second picture is B picture.

* * * * *